(12) United States Patent
Basu et al.

(10) Patent No.: US 6,332,035 B1
(45) Date of Patent: Dec. 18, 2001

(54) FAST HIERARCHICAL REPROJECTION ALGORITHMS FOR 3D RADON TRANSFORMS

(75) Inventors: Samit Basu, Clifton Park, NY (US); Yoram Bresler, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/669,505

(22) Filed: Sep. 25, 2000

Related U.S. Application Data

(63) Continuation-in-part of application No. 09/539,073, filed on Mar. 30, 2000, and a continuation-in-part of application No. 09/419,415, filed on Oct. 15, 1999, now Pat. No. 6,263,096, and a continuation-in-part of application No. 09/338,092, filed on Jun. 23, 1999, now abandoned, which is a continuation-in-part of application No. 09/539,074, filed on Mar. 30, 2000, and a continuation-in-part of application No. 09/418,933, filed on Oct. 15, 1999, now Pat. No. 6,282,257, and a continuation-in-part of application No. 09/338,677, filed on Jun. 23, 1999, now abandoned.

(51) Int. Cl.[7] ................................................. G06K 9/00
(52) U.S. Cl. ................................................. 382/128; 378/4
(58) Field of Search ....................................... 382/128, 129, 382/130, 131; 378/5

(56) References Cited

U.S. PATENT DOCUMENTS

| | | | |
|---|---|---|---|
| 4,042,811 | 8/1977 | Brunnett et al. | 235/151.3 |
| 4,149,247 | 4/1979 | Pavkovich et al. | 364/414 |
| 4,217,641 | 8/1980 | Naparstek | 364/414 |
| 4,491,932 | 1/1985 | Ruhman et al. | 364/900 |
| 4,616,318 | 10/1986 | Crawford | 364/414 |
| 4,626,991 | 12/1986 | Crawford et al. | 364/414 |
| 4,709,333 | 11/1987 | Crawford | 364/414 |
| 4,714,997 | 12/1987 | Crawford et al. | 364/414 |
| 4,718,010 * | 1/1988 | Fulii | 378/5 |
| 4,858,128 | 8/1989 | Nowak | 364/413.13 |

(List continued on next page.)

FOREIGN PATENT DOCUMENTS 611181    8/1994 (EP) .

OTHER PUBLICATIONS

G.L. Zeng; "A Rotating and Warping Projector/Backprojector for Fan–Beam and Cone–Beam Iterative Algorithm", *IEEE Transactions on Nuclear Science*, vol. 41, No. 6, pp. 2807–2811; Dec. 1994.

Gary H. Glover et al.; "An Algorithm for the Reduction of Metal Clip Artifacts in CT Reconstructions"; *Medical Physics*, vol. 8, No. 6, pp. 799–807; Nov./Dec. 1981.

McCorkle et al.; "An Order $N^2\log(N)$ Backprojector algorithm for Fovusing Wide–Angle Wide–bandwidth Arbitrary– motion Synthetic Aperture Radar"; *SPIE* vol. 2747, pp. 25–36; 1996.

(List continued on next page.)

*Primary Examiner*—Joseph Mancuso
*Assistant Examiner*—A Tabatabai
(74) *Attorney, Agent, or Firm*—Greer, Burns & Crain, Ltd.

(57) ABSTRACT

A method for reprojecting a 3D image into a 3D Radon sinogram includes the steps of dividing a three-dimensional image into sub-images as small as one voxel and reprojecting the sub-images at a smaller number of orientations to form subsinograms. These sub-sinograms are then successively aggregated and processed to form a full sinogram. The method uses two algorithms to aggregate the sub-sinograms. In one algorithm, the aggregation is exact, and in the other algorithm, aggregation is an approximation, and involves increasing the number of orientations by interpolation. The first algorithm is accurate, but relatively slow, and the second algorithm is faster, but less accurate. By performing some aggregations with the exact algorithm and some aggregations with the approximate algorithm, switching between the two algorithms in one of a number of suitable ways, an accurate result can be obtained quickly.

8 Claims, 2 Drawing Sheets

U.S. PATENT DOCUMENTS

| | | | |
|---|---|---|---|
| 4,930,076 | 5/1990 | Meckley | 364/413.21 |
| 4,991,093 | 2/1991 | Roberge et al. | 364/413.15 |
| 5,008,822 | 4/1991 | Brunnett et al. | 364/413.21 |
| 5,136,660 | 8/1992 | Flickner et al. | 382/46 |
| 5,224,037 | 6/1993 | Jones et al. | 364/413.19 |
| 5,229,934 | 7/1993 | Mattson et al. | 364/413.21 |
| 5,243,664 | 9/1993 | Tuy | 382/6 |
| 5,253,308 * | 10/1993 | Johnson | 382/304 |
| 5,300,782 | 4/1994 | Johnston et al. | 250/363.03 |
| 5,375,156 | 12/1994 | Kuo-Petravic et al. | 378/9 |
| 5,396,528 | 3/1995 | Hu et al. | 378/14 |
| 5,438,602 | 8/1995 | Crawford et al. | 378/4 |
| 5,552,605 | 9/1996 | Arata | 250/363.04 |
| 5,559,335 | 9/1996 | Zeng et al. | 250/363.04 |
| 5,579,358 | 11/1996 | Lin | 378/4 |
| 5,625,190 | 4/1997 | Crandall | 250/363.03 |
| 5,654,820 | 8/1997 | Lu et al. | 359/298 |
| 5,727,041 | 3/1998 | Hsieh | 378/4 |
| 5,778,038 | 7/1998 | Brandt et al. | 378/4 |
| 5,796,803 | 8/1998 | Flohr et al. | 378/15 |
| 5,805,098 | 9/1998 | McCorkle | 342/25 |
| 5,825,031 * | 10/1998 | Wong et al. | 250/363 |
| 5,848,114 | 12/1998 | Kawai et al. | 378/4 |
| 5,862,198 | 1/1999 | Samarasekera et al. | 378/4 |
| 5,901,196 | 5/1999 | Sauer et al. | 378/4 |
| 6,028,907 | 2/2000 | Adler et al. | 378/4 |
| 6,108,007 | 8/2000 | Shochet | 345/430 |

OTHER PUBLICATIONS

Cobb et al; "Real–time Image Formation Effort Using Quadtree Backprojection and Reconfigurable Processing"; *Third Annual Federated Laboratory Symposium on Advanced Sensors*; pp. 133–137; Feb. 2–4, 1999.

Oh et al.; "Multi–resolution Mixed–radix Quadtree SAR Image Focusing Algorithms", *Third Annual Federated Laboratory Symposium on Advanced Sensors*; pp. 139–143; Feb. 2–4, 1999.

Martin L. Brady; "A Fast Discrete Approximation Algorithm for the Radon Transform"; *SIAM J. Comput*. vol. 27, No. 1, pp. 107–119; Feb. 1998.

A. Brandt et al.; "Fast Calculation of Multiple Line Integrals"; *SIAM J. Sci. Comput.*, vol. 20, No. 4, pp. 1517–1429; 1999.

Achi Brandt et al.; :A Fast and Accurate Multilevel Inversion of the Radon Transform; *SIAM J. Appl. Math.*, vol. 60, No. 2, pp. 437–462; 1999.

Carl R. Crawford; "Reprojection Using a Parallel Backprojector", Elscint Ltd., P.O. Box 5258, Haifa, Israel; Mar. 12, 1986.

Carl R. Crawford et al.; "High Speed Reprojection and its Applications"; *SPIE vol. 914 Medical Imaging II*; 1988.

Per–Erik Danielsson et al.; Backprojection in $O(N^2 \log N)$ Time; *IEEE Medical Imaging Conference*, Albuquerque, NM; Nov. 12–15, 1997.

Alexander H. Delaney; "A Fast and Accurate Fourier Algorithm for Iterative Parallel–Beam Tomography"; *IEEE Transactions on Image Processing*, vol. 5, No. 5, pp. 740–753; May 1996.

E.C. Frey et al.; "A Fast Projector–Backprojector Pair Modeling the Asymmetric, Spatially Varying Scatter Response Function for Scatter Compensation in SPECT Imaging", *IEEE Transactions on Nuclear Science*, vol. 40, No. 4, pp. 1192–1197; Aug. 1993.

Sung–Cheng Huang et al.; "Capability Evaluation of a Sinogram Error Detection and Correction Method in Computed Tomography", *IEEE Transactions of Nuclear Science*, vol. 39, No. 4, pp. 1106–1110; 1992.

Eric Michielssen; "A Multilevel Matrix Decomposition Algorithm for Analyzing Scattering from Large Structures", *IEEE Transactions on Antennas and Propagation*, vol. 44, No. 8, pp. 1086–1093; Aug. 1996.

John M. Ollinger, "Iterative Reconstruction–Reprojection and the Expectation–Maximization Algorithm", *IEEE Transactions on Medical Imaging*, vol. 9, No. 1, pp. 94–98; Mar. 1990.

John M. Ollinger, "Reconstruction–Reprojection Processing of Transmission Scans and the Variance of PET Images", *IEEE Transactions on Nuclear Science*, vol. 39, No. 4, pp. 1122–1125; 1992.

T.M. Peters; "Algorithms for Fast Back–and–Re–Projection in Computed Tomography"; *IEEE Transactions on Nuclear Science*, vol. NS–28, No. 4, pp. 3641–3646; Aug. 1981.

Jorge L.C. Sanz; "Computing Projections of Digital Images in Image Processing Pipeline Architectures", *IEEE Transactions on Acoustics, Speech, and Signal Processing*, vol. ASSP–35, No. 2, pp. 198–207; Feb. 1987.

Herman Schomberg et al.; "The Gridding Method for Image Reconstruction by Fourier Transformation"; *IEEE Transactions on Medical Imaging*, vol. 14, No. 3, pp. 596–607; Sep. 1995.

Dan–Chu Yu et al.; "Study of Reprojection Methods in Terms of Their Resolution Loss and Sampling Errors"; *IEEE Transactions on Nuclear Science*, vol. 40, No. 4, pp. 1174–1178; Aug. 1993.

Marr et al; "On two approaches to 3D reconstruction in NMR Zeumatography", *Mathematical Aspects of Computerized Tomography Proceedings*, Oberwolfach, pp 225–240; Feb. 10–16, 1980.

Axelsson et al.; Three–dimensional reconstruction from cone–beam data in $O(N^3 \log N)$ time; *Phys. Med. Biol. 39*, pp 477–491; 1994.

Clack et al.; "Cone–beam reconstruction by the use of Radon transform intermediate functions", *Journal of the Optical Society of America A*/vol. 11, No. 2, pp 580–585; Feb. 1994.

Nicolas J. Dusaussoy; VOIR: A Volumetric Image Reconstruction Algorithm Based on Fourier Techniques for Inversion of the 3–D Radon Transfrom; *IEEE Transactions on Image Processing*, vol. 5, No. 1, pp 121–131; Jan. 1996.

V. P. Palamadov; Localization of Harmonic Decomposition of the Radon Transform; *Inverse problems 11*; pp 1025–1030; 1995.

Smith et al.; Implementations, Comparisons, and an Investigation of Heuristic Techniques for Cone–Beam Tomography; *IEEE Transactions on Medical Imaging*, vol. 15, No. 4, pp 519–531; Aug. 1996.

Grangeat et al.; Indirect Cone–Beam Three–Dimensional Image Reconstrcution; *Contemporary Perspectives in Three–Dimensional Biomedical Imaging*, pp 29–51; 1997.

Maria Magnusson Seger, Three–dimensional reconstruction from cone–beam data using an efficient Fourier technique combined with a special interpolation filter; *Phys. Med. Biol. 43*, pp 951–959, Jul. 31, 1997.

Xiaochuan Pan; Quasi–Bandlimited Properties of Radon Transforms and Their Implications for Increasing Angular Sampling Densities, *IEEE Transactions on Medical Imaging*, vol. 17, No. 3, pp 395–406; Jun. 1998.

Stephan Nilsson; Fast Backprojection; *Dept. Of Electrical Eng., Linkopings universitet, Sweden*, pp 1–8; Jul. 4, 1996.

Per–Erik Danielsson; Iterative Techniques for Projection and Back–Projection; *Dept. Of Electrical Eng., Linkopings universitet, Sweden*, pp 1–28, Jun. 10, 1997.

Stephan Nilsson; Applications of fast backprojection techniques for some inverse problems of integral geometry; *Dept. Of Mathematics., Linkopings universitet, Sweden*, pp 1–99; Jun. 19, 1997.

* cited by examiner

FAST HIERARCHICAL REPROJECTION ALGORITHMS FOR 3D RADON TRANSFORMS

This is a continuation-in-part of Ser. No. 09/539,073, filed Mar. 30, 2000, Ser. No. 09/419,415, filed Oct. 15, 1999 now U.S. Pat. No. 6,263,096, and Ser. No. 09/338,092, filed Jun. 23, 1999 now abandoned. This is also a continuation-in-part of Ser. No. 09/539,074, filed Mar. 30, 2000, Ser. No. 09/418,933, filed Oct. 15, 1999 now U.S. Pat. No. 6,282,257, and Ser. No. 09/338,677, filed Jun. 23, 1999 now abandoned. All of the parent applications are incorporated by reference in their entirety.

This invention was made with Government support under Contract No. NSF CCR 99-72980 awarded by the National Science Foundation. The Government has certain rights in this invention.

FIELD OF THE INVENTION

This invention relates to imaging, and more particularly, to the high speed 3D Radon reprojection of tomographic images in three dimensions.

BACKGROUND OF THE INVENTION

Tomographic images are created from line or plane integral measurements of an unknown object at a variety of orientations. These integral measurements, which may represent measurements of density, reflectivity, etc., are then processed to yield an image that represents the unknown object. Projection data generated in this manner is collected into a sinogram, and the sinogram is processed and backprojected to create the image. Tomographic reconstruction is the technique underlying nearly all of the key diagnostic imaging modalities, including X-ray Computed Tomography (CT), Positron Emission Tomography (PET), Single Photon Emission Count Tomography (SPECT), certain acquisition methods for Magnetic Resonance Imaging (MRI), and newly emerging techniques such as electrical impedance tomography (EIT) and optical tomography.

The 3D Radon transform is the mathematical model that describes some of the true volumetric (i.e., 3D) imaging technologies. A single 3D Radon projection is a one dimensional function corresponding to a collection of integrals of the object function on planes at a given orientation and at different positions. The 3D Radon transform of the object is the collection of its 3D Radon projections at all orientations. In MRI, projection mode imaging collects samples of the 3D Radon transform. Projection mode imaging is considered a good candidate for imaging in the presence of patient motion. The 3D radon transform also underlies true 3D Synthetic Aperture Radar (SAR) imaging.

One of the most important applications of the 3D Radon transform (and of reprojection) is in the context of cone-beam tomography, which is an emerging imaging modality in medical imaging. Through specialized preprocessing methods, such as those described in U.S. Pat. Nos. 5,124,914, 5,257,183, 5,444,792 and 5,446,776, which are incorporated by reference in their entirety, cone-beam tomographic data can be mapped into samples of the 3D Radon transform. The problem of recovering the volume being imaged from these samples can then be solved in terms of 3D Radon transforms.

Regardless of how the data is collected, either by MRI, SAR, etc., the reconstruction problem for the 3D Radon transform often involves artifact correction. This artifact correction process involves the reprojection operation, which simulates the physical tomographic acquisition system. Furthermore, the complexity requirements are high for volumetric imaging, necessitating the use of fast algorithms. Indeed, the problem is so computationally demanding that true cone-beam tomography is not yet practical, although the hardware is becoming readily available.

Another important application of reprojection is in the realm of partial data problems. In many modalities, only partial data is available. Examples include 3D SAR and cone-beam tomography with any incomplete source orbit (such as single circle). The reconstruction problem in these cases requires the use of iterative reconstruction algorithms that require repeated reprojection operations, which also need significant acceleration to become practical. Reprojection can be used in conjunction with the hierarchical 3D Radon backprojection, as described in U.S. patent application Ser. No. 539,074, filed Mar. 30, 2000, in iterative reconstruction algorithms which require both reprojection and backprojection at each step.

Several methods of reprojection have been developed. Direct reprojection represents one method for reprojection in which the physical system is simulated using the defining equations for the 3D radon transform. This is a relatively slow method, which requires $O(N^5)$ computations for calculating $O(N^2)$ projections from an $N \times N \times N$ sized volume.

The Separation method takes advantage of the fact that for certain distributions of the projection orientations, the 3D problem can be decoupled into a set of 2D problems. These 2D problems can then be solved using direct methods. In this way, a fast algorithm is constructed, that computes $O(N^2)$ projections from an $N \times N \times N$ sized volume in $O(N^4)$ computations.

The Fourier Slice approach described in Swedish Patent Application No. 9700072-3, filed Jan. 14, 1997, works by the Fourier Slice Theorem, which states that the Fourier transform of the projections are "slices" of the Fourier transform of the object, and can thus be computed efficiently by interpolation from the 3D Fourier transform of the volume.

In the Linogram approach, a series of interpolations and resampling operations are used to transform the data into samples of the object's Fourier transform on a special grid. The object can then be recovered efficiently using Fast Fourier Transforms. This is also a fast algorithm which requires $O(N^3 \log_2 N)$ computations for computing $O(N^2)$ projections from an $N^3$ volume.

In all, there is a need for fast, efficient and accurate reprojection processes for 3D images.

SUMMARY OF THE INVENTION

In keeping with one aspect of this invention, a method for reprojecting a 3D image (3D array of numbers) into a 3D Radon sinogram includes the steps of dividing the three-dimensional image into sub-volumes as small as one volumetric picture element (voxel), and reprojecting the sub-volumes at a small number of orientations to form a plurality of sub-sinograms. These sub-sinograms are then successively aggregated and processed to form a full sinogram for the initial volume.

The method uses two processes to aggregate the sub-sinograms. In one process, aggregation is exact, and in the other process, aggregation is an approximation. The first process is accurate, but relatively slow, and the second process is faster, but less accurate. By performing some aggregations with the exact process and some aggregations with the approximate process, switching between the two processes in any of a number of suitable ways, an accurate result can be obtained quickly.

BRIEF DESCRIPTION OF THE DRAWINGS

These and other features and advantages of the invention will be apparent to those skilled in the art with reference to the detailed description and the drawings, of which.

DETAILED DESCRIPTION

Figure 1:
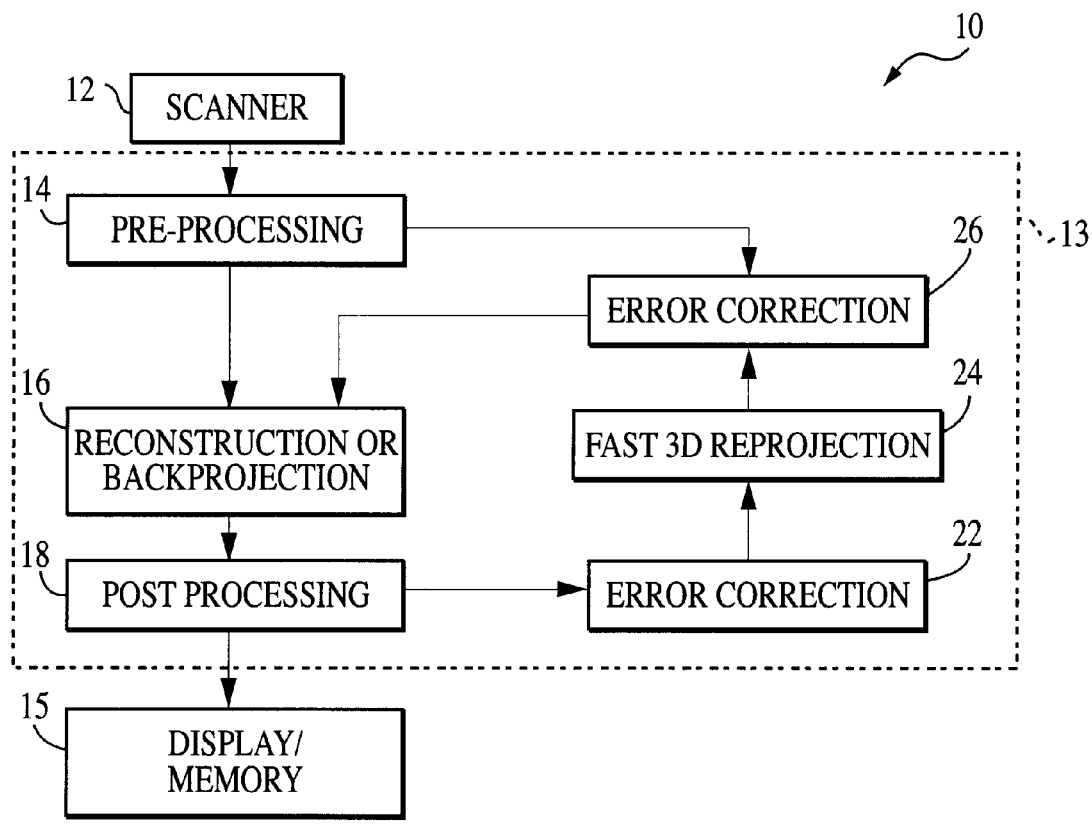
FIG. 1 is a block diagram of a method and apparatus used to practice the present invention.

A method and apparatus used to practice this invention is shown generally in FIG. 1. The input used in the reprojection method of the invention represents a volume (3D array of numbers). From this, the goal of reprojection is to compute projections which are collections of parallel plane-integrals along different orientations. The array of projection data is called a sinogram. The apparatus 10 used to practice the method could be a CT scanner or a variety of other imaging devices. The apparatus 10 includes a scanner 12, processing apparatus 13, which can be a suitable computer, special-purpose hardware or a combination thereof, programmed to perform the steps shown, and a display/memory 15. The scanner 12 scans an object such as a head, which generates raw data. The data is preprocessed (Step 14) which can include processing such as re-binning, interpolation, filtering, or reformatting from cone beam to 3D Radon data, or its derivative. The output of the pre-processing Step 14 is reconstructed in Step 16. After post-processing in Step 18, the resulting image can be displayed or stored in memory 15. However, if the image has artifacts (due to, e.g., a piece of metal in a head), the artifacts can be removed by performing error correction in Steps 22 and 26, before and/or after a reprojection Step 24. The error correction (Step 22) uses post-processed reconstruction data, generating either a correction image or a corrected image. The data are then reprojected in Step 24 and used for further error correction in Step 26. Reconstruction, reprojection and error correction can be repeated until the artifacts are corrected.

In addition to artifact correction, the fast reprojection step 24 can be used with iterative reconstruction algorithms. These algorithms permit reconstruction in the presence of missing or very noisy data, and allow for flexibility in the reconstruction process. In achieving this flexibility, however, iterative reconstruction techniques require a number of iterations, in which a candidate reconstruction is reprojected and backprojected successively. Such algorithms can have a structure similar to that shown in FIG. 1, with a backprojection step taking the role of Reconstruction Step 16. The algorithm of this invention can also be used for the acceleration of iterative reconstruction.

Figure 2:
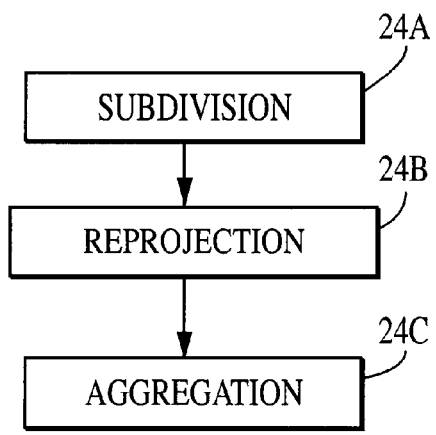
FIG. 2 is a diagram of a 3D reprojection process of this invention.

The fast reprojection method used in Step 24 in FIG. 1 is shown in greater detail in FIG. 2. The input volume (3D array of numbers) is recursively subdivided into subvolumes as small as one voxel (Step 24A). These subvolumes are reprojected at a small number of orientations into a plurality of subsinograms (Step 24B), and the resulting subsinograms are aggregated (Step 24C) to form a sinogram for the initial volume, which is the output of the reprojection step. The sinogram is reconstructed in Step 16 (FIG. 1)(or in the case of iterative algorithms, it is backprojected), or error correction is performed in step 26 (Step 24D).

The reprojection process uses two different types of aggregation processes. One process is exact, and combines a plurality of subsinograms to yield a sinogram with the same number of orientations. This aggregation process is slow, but extremely accurate. The second aggregation process is approximate, and combines a plurality of subsinograms to yield a sinogram with an increased number of orientations. By using these two aggregation processes, the precision of the algorithm can be controlled, at the cost of increased computation.

Figure 3:
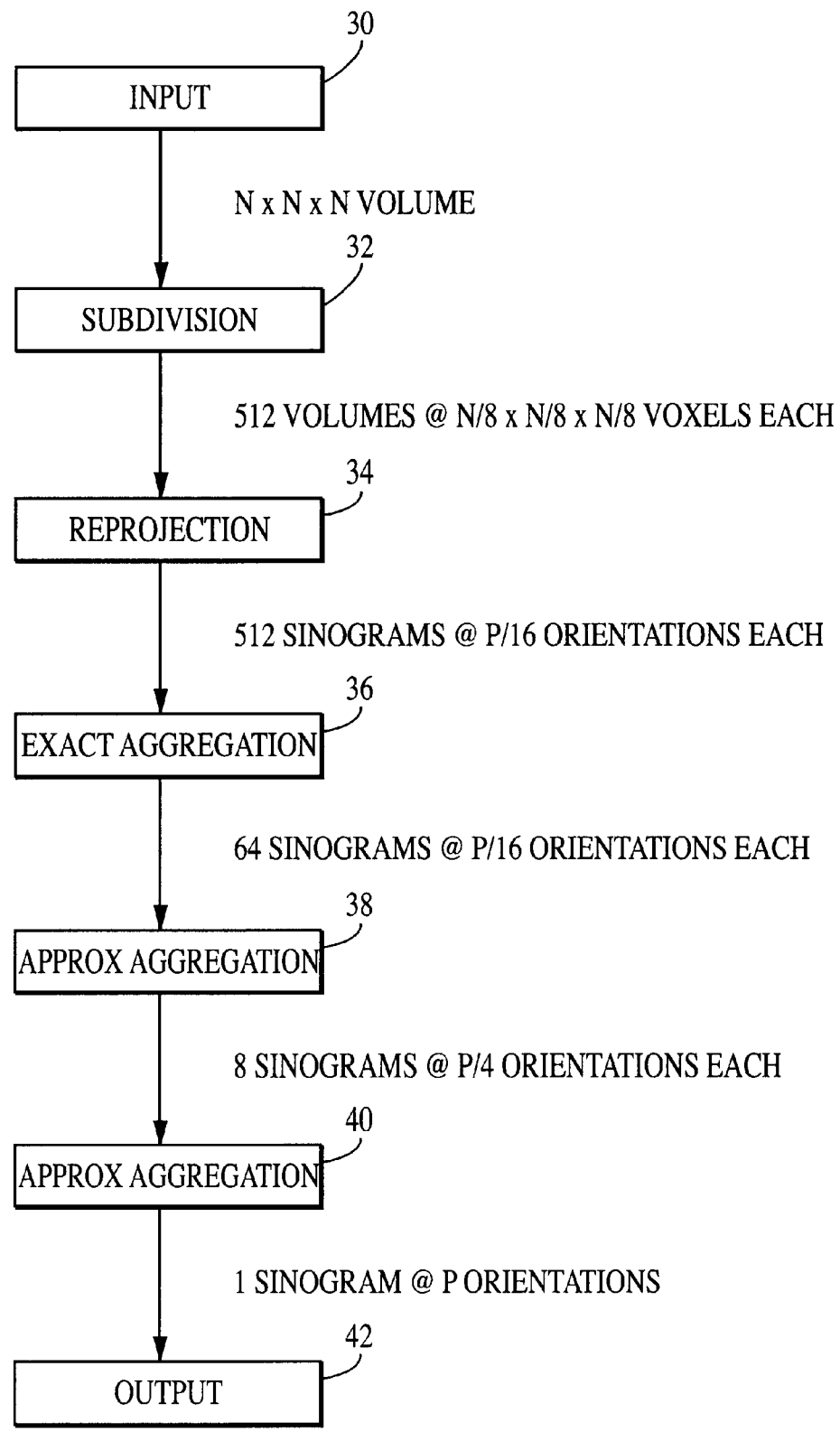
FIG. 3 is a diagram of a decomposition utilizing both exact and approximate aggregations.

An example of this use of the exact and approximate aggregation processes is shown in FIG. 3. Here, the input volume N×N×N (Step 30) is decomposed into a plurality of subvolumes such as 512 volumes having N/8×N/8×N/8 voxels each (Step 32). These subvolumes are then reprojected at a small number of orientations such as 512 sinograms having P/16 orientations each (Step 34). The resulting subsinograms then pass through a sequence of aggregation steps such as 64 sinograms having P/16 orientations each (Step 36), 8 sinograms at P/4 orientations each (Step 38), and one sinogram having P orientations (Step 40) to produce the output of a single sinogram (Step 42). Some of the steps (Step 36) involve the exact aggregation, and the number of orientations is unchanged. Some of the steps (Steps 38, 40) involve the approximate aggregation, where the number of orientations at the output is increased over the number of orientations at the input. The resulting process is fast and accurate, with the tradeoff between speed and accuracy controlled by the choice and arrangement of the approximate and exact decompositions.

One possible formulation for the decomposition and aggregation processes will now be described. Assume that a discrete volume $f(z)$, $z \in \mathbb{Z}^3$ is spatially interpolated using an interpolation kernel b as $$f_c(x) = \sum_z f(z)b(x-z). \tag{1}$$

The interpolation kernel b may be a spherical or cube-shaped voxel, tensor product of b-splines, tensor product of cardinal splines, etc. The interpolated volume is then reprojected according to $$g_c(s, p) = \int_x f_c(x)\delta(\omega_p \cdot x - s)dx, \quad 0 \leq p < P, \tag{2}$$

where $\delta(t)$ is the Dirac delta distribution, and $\|\omega_p\|_2 = 1$. Thus, $g_c(s, p)$ is a plane integral projection of $f_c$ along direction $\omega_p$, indexed by $s \in \mathbb{R}$ (the "radial" coordinate).

The radially continuous projections are then sampled using a detector response, according to $$g(k, p) = \int_s \phi((k + \tau_p)T - s)g_c(s, p)ds, \tag{3}$$

where k is an integer, and $\tau_p \in [-0.5, 0.5]$ for $p \in \{0, \ldots, P-1\}$. Equation (3) can be used to model integrating detectors, pointwise sampling, etc. as necessary.

Combining Equations (1), (2) and (3) yields the following fully discretized reprojection formula:

$$g(k, p) = \sum_z f(z) \int_x b(x-z)\phi((k+\tau_p)T - x \cdot \omega_p)dx. \quad (4)$$

For convenience, Equation (4) can be rewritten as $$g(k, p) = \sum_{z \in C_N} f(z)\rho((k+\tau_p)T - \omega_p \cdot z) \quad (5)$$

where $$\rho(s) = \int_x b(x)\phi(s - \omega_p \cdot x)dx. \quad (6)$$

where $C_N$ denotes the cube of size N×N×N centered at the origin. From Equation (4), both the approximate and exact aggregation processes can be constructed.

Let $f_l$ denote the Ith octant off centered at the origin:

$$f_l(f) = f(f - \delta_l) \, \mathbf{z} \ast \mathbf{C}_{N/2}, \quad (7)$$

where the $\delta_l \in Z^3$ are chosen appropriately. Now, $f_l$ is reprojected via $$g_l(k, p) = \sum_{z \in C_{N/2}} f_l(z)\rho(T(k + \nu_l(p)) - \omega_p \cdot z), \quad (9)$$

where $$\nu_l(p) = \left\langle \tau(p) - \frac{\delta_l \cdot \omega_p}{T} \right\rangle \quad (9)$$

and <x> is x −[x] where [x] is the integer nearest x. With Equation (8), the reprojection off is computed as $$g(k, p) = \sum_{l=1} g_l(k + s_l(p), p), \quad (10)$$

where $$s_l(p) = \left[ \tau(p) - \frac{\delta_l \cdot \omega_p}{T} \right]. \quad (11)$$

This completes the description of the exact aggregation process.

The approximate decomposition process differs in that additional processing steps are introduced to increase the number of orientations at the output as compared with the number of orientations at the input. Again, let$f_1$, denote the lth quadrant of f centered at the origin, and let $\tilde{g}(k, p)$ denote the projection of $f_l$ at a smaller number of views $P_0 < P$. Hence, the expression for $\tilde{g}(k,p)$ $$\tilde{g}_l(k, p) = \sum_{z \in C_{N/2}} f_l(z)\rho(T(k + \nu'_l(p)) - z \cdot \omega'_p) \, p \in \{0, \ldots, P_0 - 1\}, \quad (12)$$

where $\omega'_p$ are the $P_o$ orientations. Next, an inexpensive interpolation step is used to compute $g_l(k, p)$ from $\tilde{g}(k,p)$ by, e.g.

$$g_l(k, p) = \sum_m \sum_n \alpha(k, p, m, n)\tilde{g}_l(m, n) \, p \in \{0, \ldots, P-1\}, \quad (13)$$

where $\alpha$ (k, p, m, n,) is an appropriately chosen interpolation/upsampling kernel. Equation (13) represents the angular interpolation from $P_0$ projections at the orientations $\omega'_p$ to the P projections at the orientations $\omega_p$. Once Equation (13) has been applied, the combination step proceeds via Equation (10).

The decomposition can be applied recursively, reapplying either the exact or approximate processes as necessary. Finally, the overall accuracy of the process can be improved by computing projections on a radially or angularly denser set of samples than required, and then decimating the data to the required radial rate and angular rates.

To understand how these processes lead to a fast algorithm, suppose that only the approximate aggregation is used. The original volume is decomposed into $N^3$ volumes comprising a single voxel. Each of these single voxels is reprojected at $P/N^2$ orientations. A total of log N aggregation stages are used, and each time the number of orientations is increased by a factor of 4. The resulting output is a sinogram with P projections. Now, assuming that $P=O(N^2)$, the cost of the reprojection steps is negligible. Thus, the cost of the algorithm is dominated by the aggregation steps. If Equation (13) requires O (NP) operations to interpolate from P/4 projections to P projections, then the total cost of the algorithm can be shown to be $O(NP \log_2 N)$. Assuming $P=O(N^2)$, the algorithm cost becomes $O(N^3 \log_2 N)$. This is a significant improvement over direct reprojection, which requires $O(N^5)$ computations, and the Separation method, which requires $O(N^4)$ computations. The method of the invention has the same theoretical order of computation $O(N^3 \log_2 N)$ as the Fourier Slice and Linogram approaches, but because of different design trade-offs, available owing to the different principles used in this invention, it can be faster and/or more accurate.

As described, the invention is fairly general, and covers 3D tomographic data acquisition geometries of practical interest. Standard computational techniques can be applied to rearrange the proposed process structure. It can also be implemented in hardware, software, or any combination thereof. However, the defining idea of the hierarchical decomposition and the resulting recursive algorithm structure are not affected by these changes. With varying degrees of computational efficiency, the algorithm can be implemented for another radix or for an arbitrary factorization of N.

The many advantages of this invention are now apparent. Tomographic data can be manipulated with greater flexibility and accuracy in the implementation of a reprojection algorithm. Overall, 3D Radon reprojection is faster and less costly.

While the principles of the invention have been described above in connection with a specific apparatus and applications, it is to be understood that this description is made only by way of example and not as a limitation on the scope of the invention.

What is claimed is:

1. A process for generating a sinogram from a 3D electronic image, the sinogram being a collection of samples of the 3D Radon transform, comprising the steps of:

dividing the 3D image into a plurality of sub-images;
computing sub-sinograms of each of said sub-images; and
aggregating said sub-sinograms to create the sinogram, wherein said aggregating steps include a number of exact aggregations and a number of approximate aggregations.

2. The process of claim 1 wherein said aggregations are performed in a recursive manner.

3. The process of claim 1 wherein said exact aggregations are performed by radially shifting and adding said sub-sinograms.

4. The process of claim 1 wherein said approximate aggregations are performed by angularly interpolating, radially shifting, and adding said sub-sinograms.

5. Apparatus for creating a 3D image of an object comprising:

a scanner which generates data from the object;

a processor for creating at least one 3D Radon projection of the image;

means for reconstructing, or in the case of iterative reconstruction apparatus, backprojecting an image from the at least one projection;

means for detecting errors in the image produced by the reconstruction means;

means for reprojecting an image after error correction, performing additional corrections to the sinogram, and feeding the corrected sinogram to said reconstruction or backprojection means; and means for displaying the image created by the reconstruction means after the errors are corrected, wherein said reprojecting means divides the image into a plurality of sub-images, computes sub-sinograms of each of said sub-images, and aggregates said sub-sinograms to create the image sinogram by performing a number of exact aggregations and a number of approximate aggregations.

6. The apparatus of claim 5 wherein said aggregations are performed in a recursive manner.

7. The apparatus of claim 5 wherein said exact aggregations are performed by radially shifting and adding said sub-sinograms.

8. The apparatus of claim 5 wherein said approximate aggregations are performed by angularly interpolating, radially shifting, and adding said sub-sinograms.

* * * * *

UNITED STATES PATENT AND TRADEMARK OFFICE
CERTIFICATE OF CORRECTION

PATENT NO. : 6,332,035 B1
DATED : December 18, 2001
INVENTOR(S) : Basu et al.

It is certified that error appears in the above-identified patent and that said Letters Patent is hereby corrected as shown below:

Column 4,
Line 53, delete "$\|\omega_p\|2$" and insert -- $\|\omega_p\|_2$ -- therefor; and
Line 55, insert a space between "$\mathbb{R}$" and "(the "radial coordinate")".

Column 5,
Equation (5), delete "$\rho$" and insert -- $\rho_p$ -- therefor;
Line 21, delete "Ith" and insert -- $l$th -- therefor;
Line 21, delete "off" and insert -- of$f$ -- therefor;
Line 22, equation (7), delete "$f_l(l) = f(l - \delta_l) z \times C_{N/2}^{g}$" and insert --"$f_l(z) = f(z - \delta_l) \; z \in C_{N/2}$,-- therefor;
Line 38, delete "off" and insert -- of$f$ -- therefor;
Line 41, equation (10), delete "$\sum_{i=1}^{}$" and insert -- $\sum_{i=1}^{i}$ -- therefor;
Line 55, delete "let$f_1$" and insert -- let $f_1$ -- therefor;
Line 56, delete "Ith" and insert -- $l$th -- therefor;

Lines 56, 58 and 66, delete "$\tilde{g}$" (including the bold) and insert -- $\tilde{g}_l$ -- (without bold) therefor;
Line 60, equation (12), delete "$\rho$" and insert -- $\rho_p$ -- therefor;
Line 61, equation (12), insert a space before "$p \in \{$ "; and Column 6,
Line 1, equation (13), add space before "$p \in \{$ "; and
Line 6, delete the space between "$\alpha$" and "($k, p, m, n,$)" and delete "," (the comma) after "n".

Signed and Sealed this

Fourteenth Day of June, 2005

JON W. DUDAS
*Director of the United States Patent and Trademark Office*